United States Patent
Charlebois et al.

(10) Patent No.: US 7,539,968 B2
(45) Date of Patent: May 26, 2009

(54) ITERATIVE SYNTHESIS OF AN INTEGRATED CIRCUIT DESIGN FOR ATTAINING POWER CLOSURE WHILE MAINTAINING EXISTING DESIGN CONSTRAINTS

(75) Inventors: Steven E. Charlebois, Jericho, VT (US); Paul D. Kartschoke, Williston, VT (US); John J. Reilly, Huntington, VT (US); Manikandan Viswanath, South Burlington, VT (US)

(73) Assignee: International Business Machines Corporation, Armonk, NY (US)

( * ) Notice: Subject to any disclaimer, the term of this patent is extended or adjusted under 35 U.S.C. 154(b) by 99 days.

(21) Appl. No.: 11/759,332

(22) Filed: Jun. 7, 2007

(65) Prior Publication Data
US 2008/0307383 A1  Dec. 11, 2008

(51) Int. Cl.
*G06F 17/50* (2006.01)
(52) U.S. Cl. .................... 716/18; 716/2; 716/4
(58) Field of Classification Search ............ None
See application file for complete search history.

(56) References Cited

U.S. PATENT DOCUMENTS

| | | | |
|---|---|---|---|
| 5,537,330 A | * | 7/1996 | Damiano et al. ............ 716/18 |
| 6,397,170 B1 | | 5/2002 | Dean et al. |
| 6,711,719 B2 | | 3/2004 | Cohn et al. |
| 6,785,875 B2 | | 8/2004 | Beerel et al. |
| 6,789,248 B1 | | 9/2004 | Lu et al. |
| 6,952,816 B2 | | 10/2005 | Gupta et al. |

* cited by examiner

*Primary Examiner*—Leigh Marie Garbowski
(74) *Attorney, Agent, or Firm*—William D. Sabo; Hoffman Warnick LLC

(57) ABSTRACT

An approach that iteratively synthesizes an integrated circuit design to attain power closure is described. In one embodiment, the integrated circuit design is initially synthesized to satisfy timing and power constraints. Results from the initial synthesis are fed back into the synthesis process where specific nodes in the circuit design are targeted to satisfy the timing and power constraints. Selected nodes in the circuit design are worked on in an iterative manner until it has been determined that all of selected nodes have undergone evaluation for satisfying timing and power constraints. Once all of the selected nodes have undergone evaluation for satisfying timing and power constraints, then a final netlist representing the circuit design is generated.

7 Claims, 2 Drawing Sheets

ITERATIVE SYNTHESIS OF AN INTEGRATED CIRCUIT DESIGN FOR ATTAINING POWER CLOSURE WHILE MAINTAINING EXISTING DESIGN CONSTRAINTS

BACKGROUND

This disclosure relates generally to integrated circuit design, and more specifically to an iterative synthesis of an integrated circuit for attaining power closure while maintaining existing design constraints.

A typical integrated circuit design begins with a high-level circuit specification that details the function of the circuit design and the constraints of the design such as the area or physical size of the design, power dissipation, frequency, etc. The circuit function is translated to a logic design written in a hardware description language such as Very High Speed Integrated Circuit Hardware Description Language (VHDL). A synthesis tool generates or synthesizes a circuit or gate level design from the hardware description of the design. Because the initial synthesis seldom generates a design that satisfies the specified constraints, changes to the circuit design are necessary. These changes to the circuit design are made manually and can be time consuming, especially where there is a timing and power budget to satisfy. For example, changes made to the circuit design to alter its timing or area may adversely affect the power dissipation, leaving the circuit design over the power budget. Similarly, changes made to the circuit design to alter power dissipation may adversely affect the timing, leaving the circuit design not meeting the timing budget. In either case, several iterations of manual changes and measurements to determine how these changes affect existing design constraints, such as timing and power, are necessary before arriving at a design that satisfies the design constraints. An approach that can optimize an integrated circuit design for power while maintaining existing design constraints is presented.

SUMMARY

In one embodiment, there is a method for performing an iterative synthesis of an integrated circuit design to attain power closure while maintaining other design criteria. In this embodiment, the method comprises: performing an initial synthesis of the integrated circuit design to generate a netlist containing a listing of circuits and interconnections that form the integrated circuit design; generating a tag list that specifies a tag for each node in the netlist; identifying a predetermined number of nodes from the netlist that are representative of worst case power consuming nodes; performing a power reduction algorithm on each of the predetermined number of nodes; calculating power of the netlist after each instance that a power reduction algorithm is run on a node selected from the predetermined number of nodes; determining after each instance that a power reduction algorithm is run on a node selected from the predetermined number of nodes whether the netlist satisfies design constraints specified for the integrated circuit design; using the tag list to iterate through the performing of a power reduction algorithm, calculating of power and determining whether the netlist satisfies specified design constraints for each of the predetermined number of nodes; and generating a final netlist after all of the predetermined number of nodes have been iterated through the performing of a power reduction algorithm, calculating of power and determining of whether the netlist satisfies specified design constraints.

In a second embodiment, there is a computer-readable medium storing computer instructions, which when executed, enables a computer system to perform an iterative synthesis of an integrated circuit to attain power closure while maintaining other design criteria. In this embodiment, the computer instructions comprises: performing an initial synthesis of the integrated circuit design to generate a netlist representing the circuit design; generating a tag list that specifies a tag for each node in the netlist; identifying a predetermined number of nodes from the netlist that are representative of worst case power consuming nodes; selecting a node from the predetermined number of nodes; performing a power reduction algorithm on the selected node; calculating power of the netlist for each instance that a power reduction algorithm is run on the selected node; determining after each instance that a power reduction algorithm is run on the selected node whether the netlist satisfies design constraints specified for the integrated circuit design; using the tag list to select another node from the predetermined number of nodes; iterating through the performing of a power reduction algorithm, calculating of power and determining of whether the netlist satisfies design constraints for the selected node; continuing to evaluate additional nodes from the predetermined number of nodes by iterating through the performing of a power reduction algorithm, calculating of power and determining whether the netlist satisfies specified design constraints, wherein the evaluation of nodes continues until the tag list indicates that all of the predetermined number of nodes been evaluated.

DETAILED DESCRIPTION

Embodiments of this disclosure are directed to a technique for iteratively synthesizing an integrated circuit design for attaining power closure while maintaining existing design constraints. In one embodiment of this disclosure, the integrated circuit design is initially synthesized to satisfy timing and power constraints. Results from the initial synthesis are fed back into the synthesis process where specific nodes in the circuit design are targeted to satisfy the timing and power constraints. More specifically, selected nodes in the circuit design are worked on in an iterative manner until it has been determined that all of selected nodes have undergone evaluation for satisfying timing and power constraints. Once all of the selected nodes have undergone evaluation for satisfying timing and power constraints, a final netlist representing the circuit design is then generated.

Figure 1:
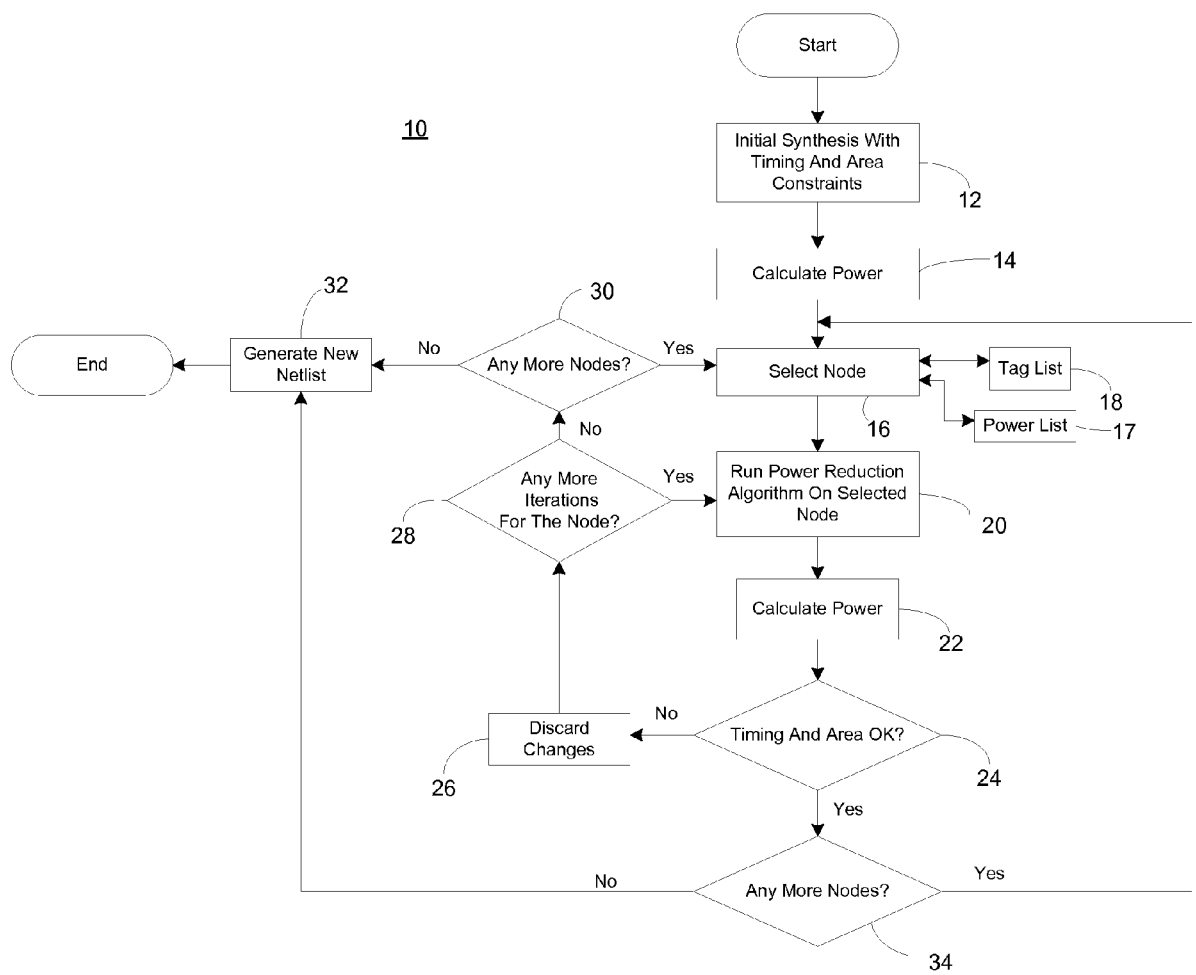
FIG. 1 shows a flow chart describing an iterative synthesis of an integrated circuit design to attain timing and power closure according to one embodiment of this disclosure.

FIG. 1 shows a flow chart describing a process 10 for performing an iterative synthesis of an integrated circuit design to power closure according to one embodiment. Although the description that follows is directed to attaining power closure while maintaining timing and area constraints, those skilled in the art will recognize that this power closure technique can be used with other design constraints besides timing and area such as testability and manufacturability.

Referring back to FIG. 1, at 12, the high-level circuit specification that details the function of circuit design is received in the form of VHDL. Area, power and timing constraints are given to a synthesis tool to design the gate-level netlist within the constraints. In particular, the initial synthesis performed at 12 generates a netlist containing a listing of circuits and interconnections that form the integrated circuit design. Although not shown in FIG. 1, the initial synthesis includes running a timing analysis on the netlist to determine if timing constraints are satisfied.

Figure 2:
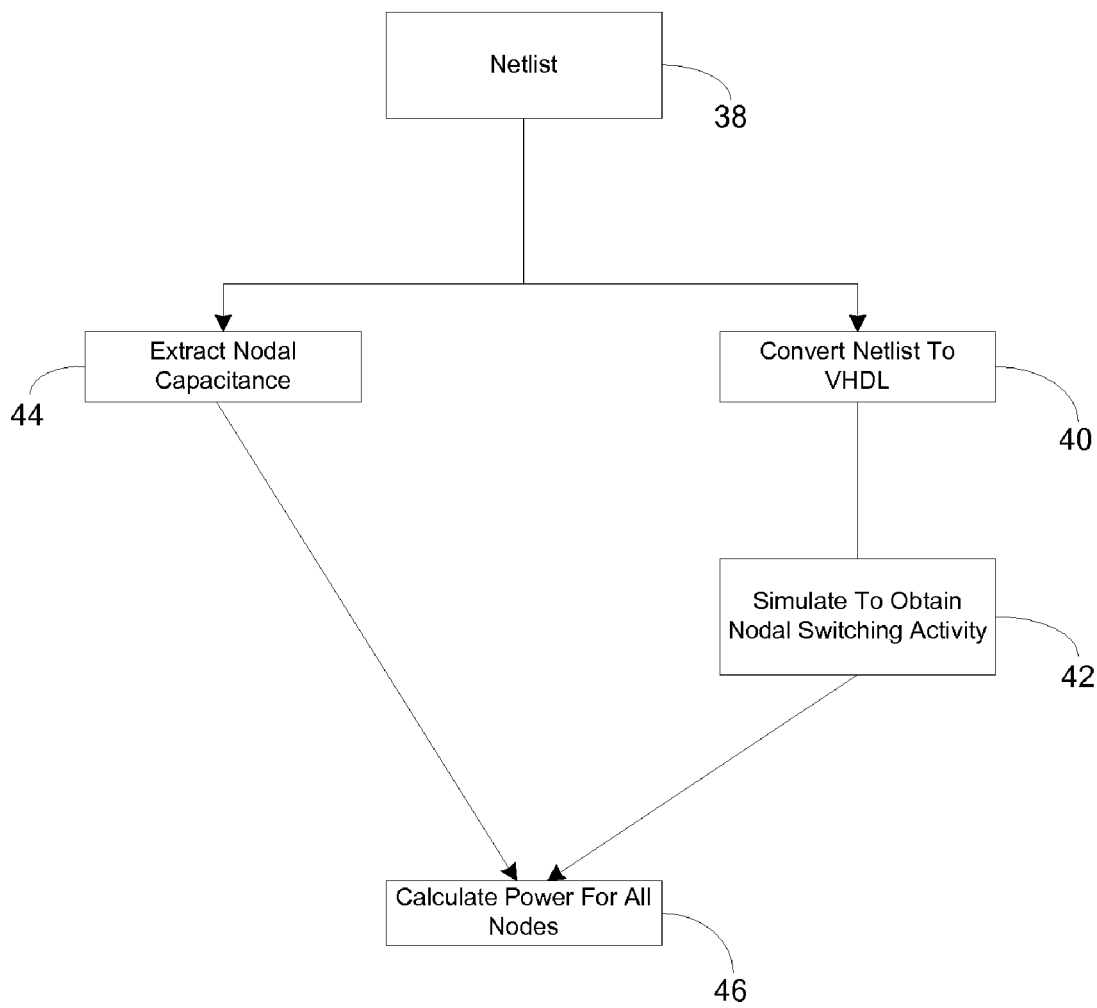
FIG. 2 shows a flow chart describing in more detail the calculating power operation shown in FIG. 1.

After the timing analysis, power that is dissipated from the circuit design represented by the netlist is calculated at 14. A more detailed description on how to calculate power is shown in FIG. 2. In particular, FIG. 2 shows a flow chart describing a process 36 associated with calculating power consumption. The process for calculating power consumption begins at 38 where the netlist is received. Once the netlist is received, process 36 begins by performing a functional simulation to ascertain how the netlist reacts in a real environment, i.e., how hardware that implements the design reacts in operating conditions. In particular, the functional simulation is interested in determining the switching activity that occurs at each node in the netlist.

These operations are described in FIG. 2 at 40 where the gate-level netlist is converted to a hardware description language such as VHDL. After converting the netlist to VHDL, a simulation is performed at 42 to obtain the switching activity at each node. Simulating the switching activity at each node occurs by incorporating the gate level netlist VHDL (VHDL netlist) into an existing simulation test bench used for verification. One or more test cases representing actual workload are run in this environment using either a cycle or event simulator such as Cadence™ NC-Sim or Synopsys™ VCS™. The simulator provides counts of how many times every node in the netlist vhdl transitions from a value of 0 to 1, or 1 to 0.

While the process 36 converts the netlist to VHDL and simulates nodal switching activity, it will also extract the nodal capacitance from the netlist at 44. After simulating nodal switching activity and extracting nodal capacitance, the process calculates power for all nodes in the netlist at 46. In particular, power is calculated by using the following formula:

$$\text{Power} = \frac{1}{2} FCV^2, \text{ wherein}$$

F=switching frequency of a source cell;
C=load capacitance driven by the source cell; and
V=total output voltage swing.

Referring back to FIG. 1, because the initial synthesis seldom generates a design that satisfies all of the specified constraints such as timing, area and power, changes to the circuit design are necessary. In one embodiment, modifications to the circuit design that close on timing, area and power constraints are made by using a tag list which lists all of the nodes in the netlist along with a tag that is specified for each node. The tag list can contain other items of data for each node. These other items of data are detailed below.

Once the tag list is created, a post synthesis is initiated. In particular, a plurality of nodes are selected to run the post synthesis process. In one embodiment, the worst case power consuming nodes from the netlist are selected. For example, if the netlist contains 1000 nodes, then the process 10 could select the top 200 worst case alternating current (AC) power consuming nodes to evaluate. Those skilled in the art will recognize that selecting the number of worst case AC power consuming nodes is user dependent and can contain as many nodes that the user wants to work on. After selecting the worst case AC power consuming nodes, the process 10 then optimizes each of the worst case nodes in an iterative manner based on nodal capacitance and nodal switching activity, while maintaining the specified timing and area constraints.

Referring back to FIG. 1, this process of selecting worst case power consuming nodes and optimizing the nodes in an iterative manner begins at 16, where a power list 17 is used to select a worst case power consuming node to work on (i.e., to optimize the node based on nodal capacitance and nodal switching activity, while maintaining the specified timing and area constraints). After selecting a node, then a power reduction algorithm is run on the selected node at 20. In particular, the power reduction algorithm is carried out through a refine process in synthesis wherein the nodes from the power list is given to the synthesis tool to work on for further modification. The operations include: change drive strength, change buffering structure, create/modify fanout tree, change placement, and structural refinement (simple to complex gate or vice versa). The power reduction algorithm maintains the original timing and area closure that was generated from the initial synthesis while performing these operations.

After the power reduction algorithm is run on the selected node, power is calculated at 22 in the manner described above. Next a determination is made at 24 to determine whether the reduced power generated from the power reduction algorithm adversely affected other design constraints such as timing and area constraints. If the design constraints are not satisfied (i.e., not okay), then the changes are discarded at 26. Although not explicitly shown in FIG. 1, a tag list 18 records that the selected node has undergone one iteration of being subjected to the power reduction algorithm, power calculation and timing and area determination. Moreover, the tag list 18 will record each time that the selected node goes through an iteration.

At 28, the process determines whether the selected node has been tagged to undergo more iterations. In one embodiment, each node in the tag list 18 contains a specified number of iterations to subject the node to the power reduction algorithm, power calculation and timing and area determination loop in instances where the power reduction adversely affects timing and area. For example, if a node has been tagged for three iterations, then three attempts can be allotted to work on the node to reduce power without adversely affecting timing and area. If it is determined at 28 that the selected node has more iteration allotments available, then the power reduction algorithm is re-run on the node at 20, power is calculated at 22 and timing and area are assessed at 24.

Alternatively, if it is determined at 28 that no more iteration allotments are available, then the process determines at 30 whether there are any more worst case power consuming nodes to evaluate. If there are more nodes to evaluate then the power list 17 is used to select the next node at 16. After selecting the next node, then the power reduction algorithm is run on the node at 20, power is calculated at 22 and timing and area are assessed at 24. Then the entry for the node in the tag list is updated.

If it is determined at 24 that the power reduction algorithm results in a positive effect, i.e., the timing and area are satisfied, then the power reduction change is accepted. If there are more worst case power consuming nodes to evaluate as determined at 34, then the power list 17 is used to select the next node at 16. Then after selecting the next node, the power reduction algorithm is run on the node at 20, power is calculated at 22 and timing and area are assessed at 24.

If there are no more worst case power consuming nodes to evaluate as determined at either decision blocks 30 and 34, then a final netlist representing the circuit design is generated at 32. As it has been shown herein, the power list 17 and tag list 18 function to ensure that only the worst case power consuming nodes are worked on and that all of these nodes are evaluated in a closed-loop manner, without ever getting caught in a never ending loop of evaluating the same node.

The foregoing flow charts shows some of the processing functions associated with an iterative synthesis of an integrated circuit design for power closure. In this regard, each block represents a process act associated with performing these functions. It should also be noted that in some alternative implementations, the acts noted in the blocks may occur out of the order noted in the figure or, for example, may in fact be executed substantially concurrently or in the reverse order, depending upon the act involved. Also, one of ordinary skill in the art will recognize that additional blocks that describe the processing functions may be added.

The process operations described above can be implemented in an entirely hardware embodiment, an entirely software embodiment or an embodiment containing both hardware and software elements. In one embodiment, the process operations are performed on a general-purpose computer and are implemented in software, which includes but is not limited to firmware, resident software, microcode, etc.

In another embodiment, the process operations can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the computer, instruction execution system, apparatus, or device. The computer readable medium can be an electronic, magnetic, optical, electromagnetic, infrared, or semiconductor system (or apparatus or device) medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include a compact disk—read only memory (CD-ROM), a compact disk—read/write (CD-R/W) and a digital video disc (DVD).

It is apparent that there has been provided with this disclosure an approach for an iterative synthesis of an integrated circuit design for attaining power closure while maintaining existing design constraints. While the disclosure has been particularly shown and described in conjunction with a preferred embodiment thereof, it will be appreciated that variations and modifications will occur to those skilled in the art. Therefore, it is to be understood that the appended claims are intended to cover all such modifications and changes as fall within the true spirit of the invention.

What is claimed is:

1. A method for performing an iterative synthesis of an integrated circuit design to attain power closure while maintaining other design criteria, comprising:
    performing an initial synthesis of the integrated circuit design to generate a netlist containing a listing of circuits and interconnections that form the integrated circuit design;
    generating a tag list that specifies a tag for each node in the netlist;
    identifying a predetermined number of nodes from the netlist that are representative of worst case power consuming nodes;
    performing a power reduction algorithm on each of the predetermined number of nodes;
    calculating power of the netlist after each instance that a power reduction algorithm is run on a node selected from the predetermined number of nodes;
    determining after each instance that a power reduction algorithm is run on a node selected from the predetermined number of nodes whether the netlist satisfies design constraints specified for the integrated circuit design;
    using the tag list to iterate through the performing of a power reduction algorithm, calculating of power and determining of whether the netlist satisfies specified design constraints for each of the predetermined number of nodes; and
    generating a final netlist after all of the predetermined number of nodes have been iterated through the performing of a power reduction algorithm, calculating of power and determining of whether the netlist satisfies specified constraints.

2. The method according to claim 1, wherein the performing of a power reduction algorithm on each of the predetermined number of nodes comprises maintaining original timing and area closure generated from the initial synthesis while running the power reduction algorithm.

3. The method according to claim 1, wherein the performing of a power reduction algorithm on each of the predetermined number of nodes comprises optimizing AC power based on nodal capacitance and nodal switching while maintaining design constraints.

4. The method according to claim 1, wherein the using of the tag list comprises tracking each instance that one of the predetermined nodes has been iterated through the performing of a power reduction algorithm, calculating of power and determining of whether the netlist satisfies specified timing and area constraints.

5. A computer-readable medium storing computer instructions, which when executed, enables a computer system to perform an iterative synthesis of an integrated circuit design to attain power closure while maintaining other design criteria, the computer instructions comprising:
    performing an initial synthesis of the integrated circuit design to generate a netlist representing the circuit design;
    generating a tag list that specifies a tag for each node in the netlist;
    identifying a predetermined number of nodes from the netlist that are representative of worst case power consuming nodes;
    selecting a node from the predetermined number of nodes;
    performing a power reduction algorithm on the selected node;
    calculating power of the netlist for each instance that a power reduction algorithm is run on the selected node;
    determining after each instance that a power reduction algorithm is run on the selected node whether the netlist satisfies design constraints specified for the integrated circuit design;
    using the tag list to select another node from the predetermined number of nodes;
    iterating through the performing of a power reduction algorithm, calculating of power and determining whether the netlist satisfies design constraints for the selected another node;
    continuing to evaluate additional nodes from the predetermined number of nodes by iterating through the performing of a power reduction algorithm, calculating of power and determining of whether the netlist satisfies specified design constraints, wherein the evaluation of nodes continues until the tag list indicates that all of the predetermined number of nodes has been evaluated.

6. The computer-readable medium according to claim 5, further comprising instructions for generating a final netlist after all of the predetermined number of nodes have been evaluated.

7. The computer-readable medium according to claim 5, wherein the calculating of power is based on nodal capacitance and nodal switching while maintaining design constraints.

* * * * *